US011961479B2

(12) United States Patent
Shi et al.

(10) Patent No.: US 11,961,479 B2
(45) Date of Patent: Apr. 16, 2024

(54) DISPLAY DEVICE AND METHOD FOR DRIVING THE SAME

(71) Applicants: Beijing BOE Optoelectronics Technology Co., Ltd., Beijing (CN); BOE TECHNOLOGY GROUP CO., LTD., Beijing (CN)

(72) Inventors: Tiankuo Shi, Beijing (CN); Wei Sun, Beijing (CN); Yifan Hou, Beijing (CN); Zhihua Ji, Beijing (CN); Xiaomang Zhang, Beijing (CN); Rui Liu, Beijing (CN); Jigang Sun, Beijing (CN); Yuxin Bi, Beijing (CN); Xue Dong, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 6 days.

(21) Appl. No.: 17/610,581

(22) PCT Filed: Dec. 22, 2020

(86) PCT No.: PCT/CN2020/138380
§ 371 (c)(1),
(2) Date: Nov. 11, 2021

(87) PCT Pub. No.: WO2022/133740
PCT Pub. Date: Jun. 30, 2022

(65) Prior Publication Data

US 2022/0398981 A1 Dec. 15, 2022

(51) Int. Cl.

*G09G 3/3266* (2016.01)
*G09G 3/20* (2006.01)
*G09G 3/3275* (2016.01)

(52) U.S. Cl.
CPC ......... *G09G 3/3266* (2013.01); *G09G 3/2096* (2013.01); *G09G 3/3275* (2013.01);
(Continued)

(58) Field of Classification Search
CPC ....... G09G 2310/04; G09G 2310/0267; G09G 2310/0205; G09G 2310/0213;
(Continued)

(56) References Cited

U.S. PATENT DOCUMENTS

| | | | | |
|---|---|---|---|---|
| 6,392,690 | B1 * | 5/2002 | Fujii | H04N 13/324 348/E13.043 |
| 10,657,903 | B2 | 5/2020 | Liu | |
| 10,923,027 | B2 | 2/2021 | Dong | |
| 2018/0366068 | A1 | 12/2018 | Liu | |

(Continued)

FOREIGN PATENT DOCUMENTS

| | | | |
|---|---|---|---|
| CN | 104123906 | A | 10/2014 |
| CN | 106782268 | A | 5/2017 |

(Continued)

OTHER PUBLICATIONS

Written Opinion for PCT Patent Application No. PCT/CN2020/138380 dated Sep. 27, 2021.

*Primary Examiner* — Amy Onyekaba
*Assistant Examiner* — Amen W Bogale
(74) *Attorney, Agent, or Firm* — Perilla Knox & Hildebrandt LLP; Kenneth A. Knox

(57) ABSTRACT

A display device and a method for driving the display device are described, where the display device includes a plurality of pixel island groups, a plurality of lenses, a positioning module, and a gate driving chip. The plurality of pixel island groups are arranged in array, wherein each of the pixel island groups includes a plurality of pixel islands, and different pixel islands are able to be scanned in different scanning modes. The positioning module is configured to determine a gaze area and a non-gaze area according to gazed coordi-
(Continued)

nates of human eye. The gate driving chip is configured to provide gate driving signals in a first driving manner to sub-pixel units in the gaze area, and provide gate driving signals simultaneously in a second driving manner to sub-pixel units in the non-gaze area during a scanning stage of the sub-pixel units in the non-gaze area.

17 Claims, 8 Drawing Sheets

(52) U.S. Cl.
CPC ............... *G09G 2300/0443* (2013.01); *G09G 2300/0452* (2013.01); *G09G 2320/0233* (2013.01); *G09G 2330/021* (2013.01); *G09G 2354/00* (2013.01)

(58) Field of Classification Search
CPC ..... G09G 2310/021; G09G 2300/0452; G09G 2320/0686; G09G 2330/021; G09G 2340/0407; G09G 2340/0457; H01L 27/3211; H01L 27/3218; H01L 51/5275
See application file for complete search history.

(56) References Cited

U.S. PATENT DOCUMENTS

| | | | | |
|---|---|---|---|---|
| 2019/0180672 | A1* | 6/2019 | Knez | G09G 5/397 |
| 2020/0058250 | A1 | 2/2020 | Dong | |
| 2020/0301505 | A1 | 9/2020 | Cheng | |
| 2021/0057493 | A1 | 2/2021 | Liu | |
| 2021/0097952 | A1* | 4/2021 | Huang | G09G 3/3688 |

FOREIGN PATENT DOCUMENTS

| | | | |
|---|---|---|---|
| CN | 107195278 | A | 9/2017 |
| CN | 107767808 | A | 3/2018 |
| CN | 109036246 | A | 12/2018 |
| CN | 109036281 | A | 12/2018 |
| CN | 109388448 | A | 2/2019 |
| CN | 109637406 | A | 4/2019 |
| CN | 109727316 | A | 5/2019 |
| CN | 110459577 | A | 11/2019 |
| CN | 111128068 | A | 5/2020 |
| CN | 111175982 | A | 5/2020 |
| CN | 107767808 | B | 9/2020 |
| EP | 3667608 | A1 | 6/2020 |
| JP | 2007322747 | A | 12/2007 |
| TW | 201441998 | A | 11/2014 |
| WO | 2019091193 | A1 | 5/2019 |
| WO | 2020140719 | A1 | 7/2020 |

* cited by examiner

DISPLAY DEVICE AND METHOD FOR DRIVING THE SAME

CROSS-REFERENCE TO RELATED APPLICATION

This application is a national phase application of International Application No. PCT/CN2020/138380, filed Dec. 22, 2020, the entire contents of which are incorporated herein by reference for all purposes.

TECHNICAL FIELD

The disclosure relates to the field of display technology and, particularly, to a display device and a method for driving the same.

BACKGROUND

With the development of display technology, users have higher and higher requirements for the resolution of display devices. For high-resolution products, a large amount of data transmission is required, thereby leading to a decrease in the refresh rate of electronic products.

In the related art, the display device usually adopts a method of distinguishing scanning between a gaze area and a non-gaze area to reduce the amount of data transmission. Specifically, the display device obtains a location of the gaze area through coordinates gazed by human eyes. During a scanning process of the display device, the sub-pixel units located in the gaze area are scanned line by line, while the sub-pixel units located in the non-gaze area are scanned with multiple lines at the same time. This can reduce the amount of data transmission while ensuring the display effect.

However, the display device generally writes data signals in a line-by-line scanning manner, and therefore, the sub-pixel units located on both sides of the gaze area cannot achieve scanning of multiple lines simultaneously.

It should be noted that the information disclosed in the background art section above is only used to enhance the understanding of the background of the present disclosure, and therefore may include information that does not constitute the prior art known to those of ordinary skill in the art.

SUMMARY

According to an aspect of the disclosure, there is provided a display device, including: a plurality of pixel island groups, a plurality of lenses, a positioning module, and a gate driving chip. The plurality of pixel island groups are arranged in array, wherein each of the pixel island groups includes a plurality of pixel islands, each of the pixel islands includes a plurality of sub-pixel units of a same color arranged in array, and different pixel islands are able to be scanned in different scanning modes. The lenses are arranged in a one-to-one correspondence with the pixel islands and configured to image corresponding pixel islands to a preset virtual image plane. The positioning module is configured to determine a gaze area and a non-gaze area according to gazed coordinates of human eye, wherein N pixel island groups are provided in the gaze area, and N is a positive integer greater than or equal to 1. The gate driving chip is configured to provide gate driving signals in a first driving manner to sub-pixel units in the gaze area during a scanning stage of the sub-pixel units in the gaze area, and provide gate driving signals simultaneously in a second driving manner to sub-pixel units in the non-gaze area during a scanning stage of the sub-pixel units in the non-gaze area.

In some embodiments of the disclosure, the first driving manner includes: the gate driving chip provides gate driving signals to the sub-pixel units in the gaze area row by row; and the second driving manner includes: the gate driving chip provides gate driving signals to the sub-pixel units in multiple rows of the gaze area simultaneously.

In some embodiments of the disclosure, the gate driving chip includes: a plurality of sub-driving chips, arranged in a one-to-one correspondence with the pixel islands, wherein each of the sub-driving chips is configured to independently provide a gate driving signal to a corresponding pixel island.

In some embodiments of the disclosure, the display device further includes a plurality of switch components, arranged in a one-to-one correspondence with the pixel islands, wherein the switch component includes a plurality of switch units, a number of the switch units is same as a number of columns of sub-pixel units in the pixel island, the sub-pixel units in a same column in the pixel island are connected to a data line through one of the switch units, and the switch unit is configured to connect the data line with the sub-pixel units in the same column in the pixel island in response to a control signal.

In some embodiments of the disclosure, during scanning of one frame, the gate driving chip is able to provide gate driving signals to the sub-pixel units connected to the gate driving chip in any order.

In some embodiments of the disclosure, the display device further includes: a source driving circuit, configured to provide a data signal to a column of sub-pixel units in the gaze area according to a pixel value during the scanning stage of the sub-pixel units in the gaze area, and provide a data signal to multiple columns of sub-pixel units in the non-gaze area according to a pixel value during the scanning stage of the sub-pixel units in the non-gaze area.

In some embodiments of the disclosure, the pixel island groups include: a R pixel island, a B pixel island, a first G pixel island and a second G pixel island. The R pixel island includes N1 rows and M1 columns of R sub-pixel units, wherein the R sub-pixel units in X-th row and Y-th column and the R sub-pixel units in (X+2)-th row and Y-th column are located in a same column, and the R sub-pixel units in X-th row and Y-th column and the R sub-pixel units in X-th row and (Y+2)-th column are located in a same row, where X is a positive integer greater than or equal to 1 and less than or equal to N1−2, and Y is a positive integer greater than or equal to 1 and less than or equal to M1−2. The B pixel island includes N1 rows and M1 columns of B sub-pixel units, wherein the B sub-pixel units in X-th row and Y-th column and the B sub-pixel units in (X+2)-th row and Y-th column are located in a same column, and the B sub-pixel units in X-th row and Y-th column and the B sub-pixel units in X-th row and (Y+2)-th column are located in a same row, where X is a positive integer greater than or equal to 1 and less than or equal to N1−2, and Y is a positive integer greater than or equal to 1 and less than or equal to M1−2. The first G pixel island includes N1 rows and M1 columns of first G sub-pixel units, wherein the first G sub-pixel units in X-th row and Y-th column and the first G sub-pixel units in (X+2)-th row and Y-th column are located in a same column, and the first G sub-pixel units in X-th row and Y-th column and the first G sub-pixel units in X-th row and (Y+2)-th column are located in a same row, where X is a positive integer greater than or equal to 1 and less than or equal to N1−2, and Y is a positive integer greater than or equal to 1 and less than or equal to M1−2. The second G pixel island includes N1 rows and M1 columns of second G sub-pixel units, wherein the second G sub-pixel units in X-th row and Y-th column and the second G sub-pixel units in (X+2)-th row and Y-th column are located in a same column, and the second G sub-pixel units in X-th row and Y-th column and the second G sub-pixel units in X-th row and (Y+2)-th column are located in a same row, where X is a positive integer greater than or equal to 1 and less than or equal to N1−2, and Y is a positive integer greater than or equal to 1 and less than or equal to M1−2. Herein, N1 and M1 are positive integers greater than 1.

In some embodiments of the disclosure, the R sub-pixel units in N1 rows and M1 columns are imaged by corresponding lenses to the preset virtual image plane to form R virtual image units in N1 rows and M1 columns; the B sub-pixel units in N1 rows and M1 columns are imaged by corresponding lenses to the preset virtual image plane to form B virtual image units in N1 rows and M1 columns; the first G sub-pixel units in N1 rows and M1 columns are imaged by corresponding lenses to the preset virtual image plane to form first G virtual image units in N1 rows and M1 columns; the second G sub-pixel units in N1 rows and M1 columns are imaged by corresponding lenses to the preset virtual image plane to form second G virtual image units in N1 rows and M1 columns. Among the virtual image units formed by the R pixel island and the B pixel island, in each of row and column direction, a R virtual image unit is arranged as only adjacent to B virtual image units, and a B virtual image unit is arranged as only adjacent to R virtual image units. Among the virtual image units formed by the first G pixel island and the second G pixel island, in each of row and column direction, a first G virtual image unit is arranged as only adjacent to second G virtual image units, and a second G virtual image unit is arranged as only adjacent to first G virtual image units. The first G virtual image units and the R virtual image units are arranged in a one-to-one correspondence, and any first G virtual image unit at least partially overlaps with a corresponding R virtual image unit; the second G virtual image units and the B virtual image units are arranged in a one-to-one correspondence, and any second G virtual image unit at least partially overlaps with a corresponding B virtual image unit.

In some embodiments of the disclosure, the display device further includes: a data acquisition unit and a processing unit. The data acquisition unit is configured to acquire RGB image data, the RGB image data including first image data corresponding to the gaze area and second image data corresponding to the non-gaze area. The processing unit is configured to generate pixel values corresponding to the sub-pixel units in the gaze area based on the first image data, and generate pixel values corresponding to the sub-pixel units in the non-gaze area based on the second image data.

In some embodiments of the disclosure, generating the pixel values corresponding to the sub-pixel units in the gaze area based on the first image data includes: acquiring from the RGB image data, according to a position of a target sub-pixel unit in the gaze area, a key sub-pixel corresponding to the target sub-pixel unit and at least one relevant sub-pixel, wherein the relevant sub-pixel is located around the key sub-pixel, and the relevant sub-pixel, the key sub-pixel, and the target sub-pixel unit correspond to a same color; and acquiring a pixel value of the target sub-pixel unit according to a pixel value of the key sub-pixel and a pixel value of the relevant sub-pixel.

In some embodiments of the disclosure, N1 rows of first virtual image units are formed by the first G virtual image units and the second G virtual image units, with each row of the first virtual image units including M1 of the first virtual image units; the RGB image data corresponds to N1 rows and M1 columns of RGB pixels. The acquiring from the RGB image data, according to the position of the target sub-pixel unit in the gaze area, the key sub-pixel corresponding to the target sub-pixel unit includes acquiring, from the RGB image data, the key sub-pixel corresponding to the target sub-pixel unit according to a preset rule. The preset rules includes, when the target sub-pixel unit corresponds to a Y-th first virtual image unit at X-th row, the key sub-pixel is located in the X-th row and Y-th column of the RGB image data, where X is a positive integer greater than or equal to 1 and less than or equal to N1, and Y is a positive integer greater than or equal to 1 and less than or equal to M1.

In some embodiments of the disclosure, N1 rows of second virtual image units are formed by the R virtual image units and the B virtual image units, with each row of the second virtual image units including M1 of the second virtual image units; and the preset rule further includes: when the target sub-pixel unit corresponds to a Y-th second virtual image unit at X-th row, the key sub-pixel is located in the X-th row and Y-th column of the RGB image data, where X is a positive integer greater than or equal to 1 and less than or equal to N1, and Y is a positive integer greater than or equal to 1 and less than or equal to M1.

In some embodiments of the disclosure, acquiring the pixel value of the target sub-pixel unit according to the pixel value of the key sub-pixel and the pixel value of the relevant sub-pixel includes: acquiring, according to the pixel value of the key sub-pixel and the pixel value of the relevant sub-pixel, a weight of the key sub-pixel to the pixel value of the target sub-pixel unit, and a weight of the relevant sub-pixel to the pixel value of the target sub-pixel unit; and acquiring the pixel value of the target sub-pixel unit according to the pixel value of the key sub-pixel, the pixel value of the relevant sub-pixel, the weight of the key sub-pixel, and the weight of the relevant sub-pixel. Herein, the pixel value of the target sub-pixel unit is calculated based on $h=\Sigma_{k=1}^{n}(h_k a_k)+h_x a_x$, where $h_x$ represents the pixel value of the key sub-pixel, $a_x$ represents the weight of the key sub-pixel, $h_k$ represents the pixel value of the relevant sub-pixel, $a_k$ represents the weight of the relevant sub-pixel, and n is greater than or equal to 1.

In some embodiments of the disclosure, there are a plurality of the relevant sub-pixels, and the key sub-pixel and the plurality of the relevant sub-pixels are distributed in an array.

In some embodiments of the disclosure, the key sub-pixel is located at a center of the array.

In some embodiments of the disclosure, the key sub-pixel and the plurality of the relevant sub-pixels are distributed in a 3*3 array.

In some embodiments of the disclosure, a virtual image frame is formed by the R virtual image unit, the B virtual image unit, the first G virtual image unit, and the second G virtual image unit corresponding to a same pixel island group; the virtual image frame includes a central area and a border area, a density of virtual image units in the border area is less than a density of virtual image units in the central area, and the virtual image units in the border area correspond to first sub-pixel units in the pixel island group; and the processing unit is further configured to set a pixel value corresponding to the first sub-pixel units to 0 gray scale.

In some embodiments of the disclosure, generating the pixel values corresponding to the sub-pixel units in the non-gaze area based on the second image data includes: acquiring, from the RGB image data, a key sub-pixel corresponding to the target sub-pixel unit according to a position of the target sub-pixel unit in the non-gaze area; and acquiring a pixel value of the key sub-pixel as the pixel value of the target sub-pixel unit; wherein in the gaze area and the non-gaze are, the key sub-pixel corresponding to the target sub-pixel unit is acquired through a same way.

According to another aspect of the disclosure, there is provided method for driving a display device, wherein the display device includes a plurality of pixel island groups and a plurality of lenses. The plurality of pixel island groups are arranged in array, wherein each of the pixel island groups includes a plurality of pixel islands, each of the pixel islands includes a plurality of sub-pixel units of a same color arranged in array, and different pixel islands are able to be scanned in different scanning modes. The plurality of lenses are arranged in a one-to-one correspondence with the pixel islands, and configured to image corresponding pixel islands to a preset virtual image plane;

The method includes: determining a gaze area and a non-gaze area according to gazed coordinates of human eye, wherein N pixel island groups are provided in the gaze area, and N is a positive integer greater than or equal to 1; providing, at a scanning stage of the sub-pixel units in the gaze area, gate driving signals to the sub-pixel units in the gaze area row by row; and providing, at a scanning stage of the sub-pixel units in the non-gaze area, gate driving signals simultaneously to multiple adjacent rows of sub-pixel units in the non-gaze area.

In some embodiments of the disclosure, the display device further includes a gate driving chip configured to, during scanning of one frame, provide gate driving signals to the sub-pixel units connected thereto in any order; and the method further includes: providing, through the gate driving chip during scanning of one frame, gate driving signals to the sub-pixel units in the gaze area first.

It should be understood that the above general description and the following detailed description are only exemplary and explanatory without limiting the disclosure.

BRIEF DESCRIPTION OF THE DRAWINGS

The drawings herein, which are incorporated in and constitute a part of this specification, illustrate embodiments consistent with the disclosure, and serve to explain the principles of the disclosure together with the description. Understandably, the drawings in the following description are just some embodiments of the disclosure. For those of ordinary skill in the art, other drawings may be obtained based on these drawings without creative efforts.

DETAILED DESCRIPTION

Figure 1:
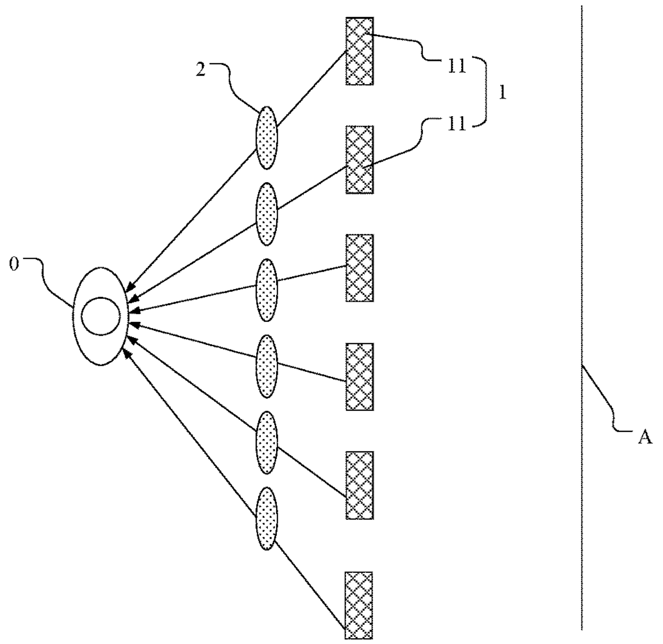
FIG. 1 is a schematic diagram illustrating the working principle of the display device according to some exemplary embodiments of the disclosure.

Exemplary embodiments will now be described more fully with reference to the accompanying drawings. However, the exemplary embodiments can be implemented in various forms and should not be construed as limited to the embodiments set forth herein. Rather, these embodiments are provided so that this disclosure will be thorough and complete, and will fully convey the concept of the exemplary embodiments to those skilled in the art. The same reference numerals in the drawings indicate the same or similar structures, and thus their detailed descriptions will be omitted.

Although relative terms such as "up" and "down" are used in this specification to describe the relative relationship between one component and another, these terms are used in this specification only for convenience, for example, based on directions of the example as illustrated in the drawings. It can be understood that if the device as illustrated is turned over, that is, turned upside down, the component described as "upper" will become the "lower" component. Other relative terms, such as "high", "low", "top", "bottom", "left", and "right" have similar meanings. When a structure is "on" another structure, it may refer to that a certain structure is integrally formed on the other structure, or that a certain structure is "directly" provided on the other structure, or that a certain structure is "indirectly" provided on the other structure through other structures.

The terms "a", "an", and "the" are used to indicate presence of one or more elements/components or the like. The terms "comprise/include" and "have/has" refer to non-excluding inclusion and, for example, in addition to the included elements/components or the like, there may be additional elements/components or the like.

Figure 2:
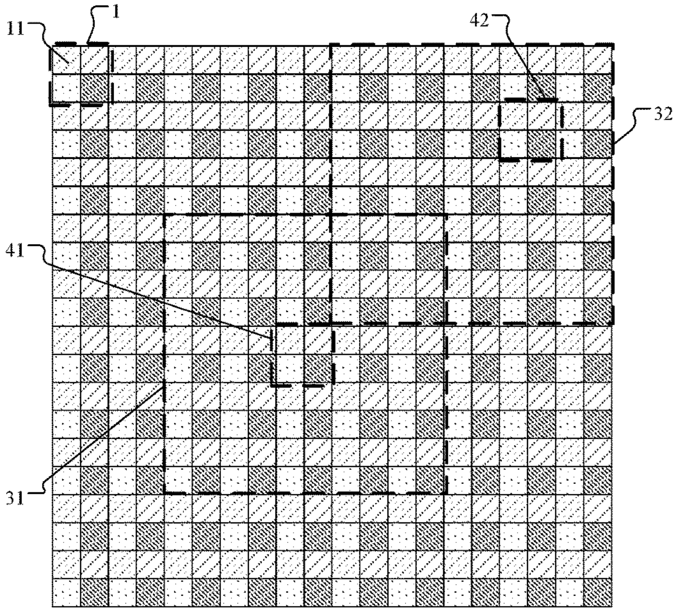
FIG. 2 is a schematic diagram illustrating a distribution of pixel structures in the display device according to some exemplary embodiments of the disclosure.
Figure 3:
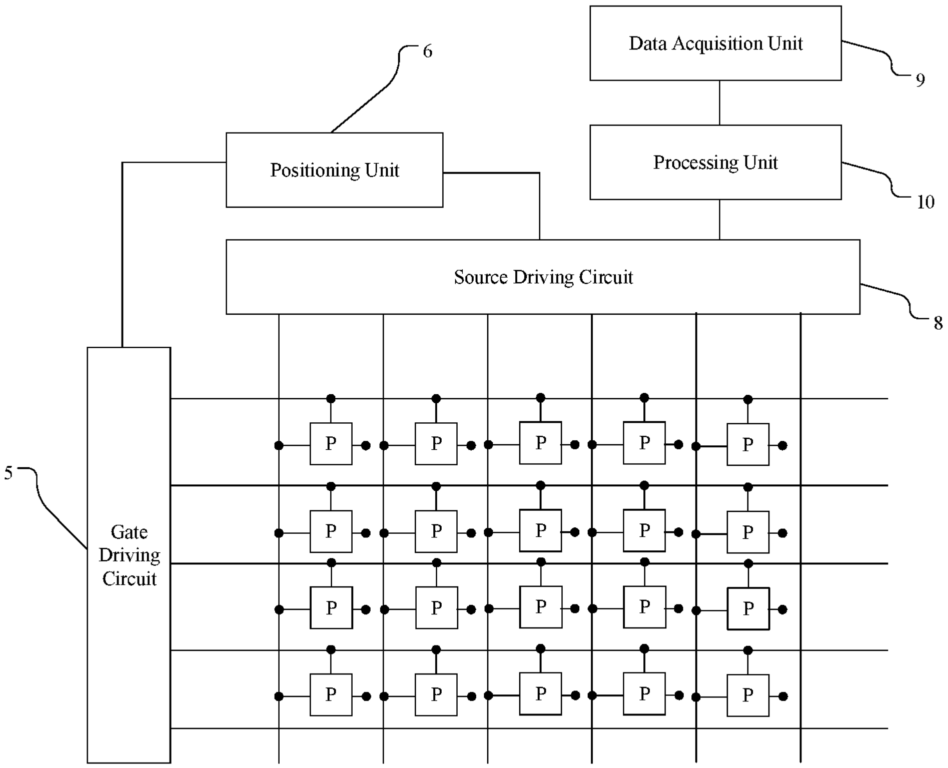
FIG. 3 is a block diagram of the display device according to some exemplary embodiments of the disclosure.

Exemplary embodiments provide a display device. As shown in FIG. 1, FIG. 2, and FIG. 3, FIG. 1 is a schematic diagram illustrating the working principle of the display device according to some exemplary embodiments of the disclosure, FIG. 2 is a schematic diagram illustrating a distribution of pixel structures in the display device according to some exemplary embodiments of the disclosure, FIG. 3 is a block diagram of the display device according to some exemplary embodiments of the disclosure. The display device includes a plurality of pixel island groups 1, a plurality of lenses 2, a positioning module 6 and a gate driving chip 5. The plurality of pixel island groups 1 are arranged in array, wherein each of the pixel island groups 1 includes a plurality of pixel islands 11, each of the pixel islands 11 includes a plurality of sub-pixel units P of a same color arranged in array, and different pixel islands 11 are able to be scanned in different scanning modes. The lenses 2 are arranged in a one-to-one correspondence with the pixel islands 11 and configured to image corresponding pixel islands 11 to a preset virtual image plane A. Specifically, the lens 2 can transmit the light emitted by the pixel island 11 to the human eye 0, such that the human eye 0 can see the image formed by the pixel island 11 on the preset virtual image plane A. The positioning module 6 is configured to determine a gaze area 31 and a non-gaze area according to gazed coordinates 41 of human eye, wherein 25 pixel island groups are provided in the gaze area 31. The gate driving chip 5 is configured to provide gate driving signals, row by row, to sub-pixel units in the gaze area 31 during a scanning stage of the sub-pixel units 31 in the gaze area, and provide gate driving signals simultaneously to multiple adjacent rows of sub-pixel units in the non-gaze area during a scanning stage of the sub-pixel units in the non-gaze area.

In some exemplary embodiments, different pixel islands 11 can be scanned in different scanning modes, that is, each pixel island can be independently scanned either in the simultaneous multiple-rows scanning mode or the row-by-row scanning mode. For example, among two pixel islands located in the same row, sub-pixel units in one of the two pixel islands can be scanned row by row, and sub-pixel units in the other pixel island can be scanned in multiple rows at the same time. It should be understood that scanning a sub-pixel unit can be understood as writing a data signal into the sub-pixel unit under the action of the gate driving signal.

In some exemplary embodiments, the display device is divided into the gaze area and the non-gaze area other than the gaze area by using the pixel island group as a basic unit, and different pixel islands 11 can be scanned in different scanning modes. Therefore, the display device can be realized in such a way that only the sub-pixel units in the gaze area are scanned row by row, while the sub-pixel units in the non-gaze area are scanned with multiple rows at the same time.

In some exemplary embodiments, the positioning module 6 determines the gaze area 31 according to the gazed coordinates 41 of human eye in the following manner. The positioning module 6 determines the gazed coordinates 41 according to a gazing direction of the human eye. The gazed coordinates 41 may be located on a pixel island group, and the gaze coordinate 41 may be located at the center of the gaze area 31. In some exemplary embodiments, when the gaze area is located at a corner position of the display device, the gazed coordinates may also be located at a non-central position of the gaze area. For example, as shown in FIG. 2, when the gazed coordinates fall within the dashed frame 42, the gaze are is at the position of the dashed frame 32. In some exemplary embodiments, if the gazed coordinates are located at any position in the dashed frame 32, the gaze area corresponding to the gazed coordinates is located at the position of the dashed frame 32.

It should be understood that in other exemplary embodiments, the sub-pixel units in the gaze area can also be scanned simultaneously in multiple rows, wherein the number of rows of sub-pixel units simultaneously scanned in the gaze area may be smaller than the number of rows of sub-pixel units simultaneously scanned in the non-gaze area. In other exemplary embodiments, other numbers of pixel island groups may be included in the gaze area 31. For example, the gaze area 31 may include 1 pixel island group, 4 pixel island groups, and so on.

In some exemplary embodiments, when a luminescent material layer is formed on a pixel definition layer of the display device, an opening size of the mask may be equal to a size of the pixel island, and the opening of the mask may be directly opposite to the pixel island one by one. In this way, the luminescent material layer on each pixel island can be formed in an integral structure. This configuration can increase the aperture ratio of the display device, thereby increasing the brightness of the display device.

Figure 4:
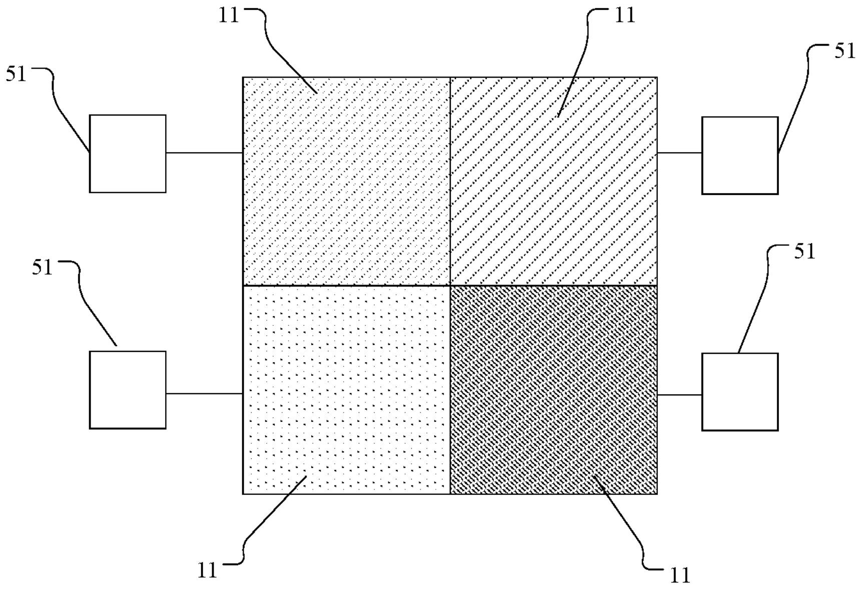
FIG. 4 is a schematic structural diagram of the display device according to some other exemplary embodiments of the disclosure.

In some exemplary embodiments, as shown in FIG. 4, it is a schematic structural diagram of the display device according to some other exemplary embodiments of the disclosure. One way to realize that the different pixel islands can be scanned in different scanning modes may be that the gate driving chip 5 includes a plurality of sub-driving chips 51, and the sub-driving chips 51 correspond to the pixel islands 11 in a one-to-one manner. Each of the sub-driving chips 51 is configured to independently provide gate driving signals to its corresponding pixel island 11. For example, one sub-driving chip 51 can provide gate driving signals to the sub-pixel units in the pixel island 11 row by row, and the other sub-driving chip 51 can provide gate driving signals to the sub-pixel units in the pixel island 11 in multiple rows at the same time.

Figure 5:
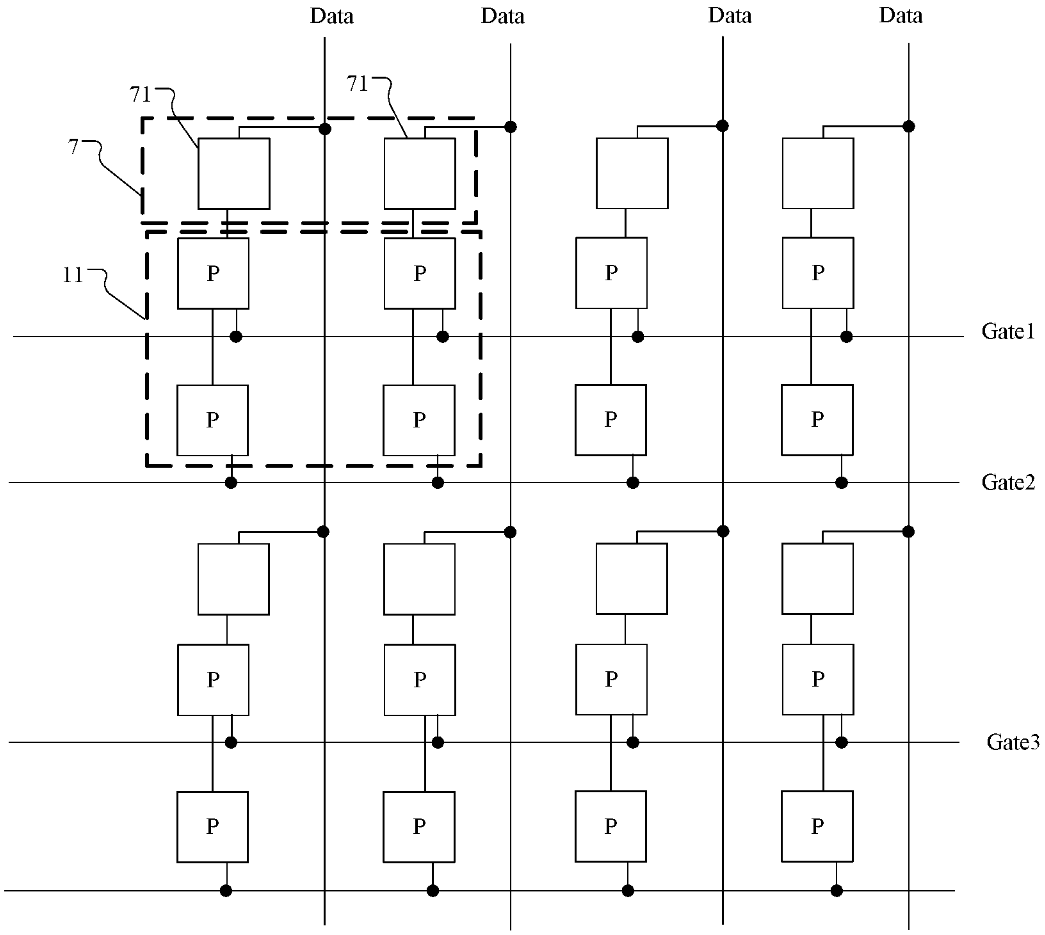
FIG. 5 is a schematic structural diagram of the display device according to some other exemplary embodiments of the disclosure.

In some exemplary embodiments, as shown in FIG. 5, it is a schematic structural diagram of the display device according to some other exemplary embodiments of the disclosure. Another way to realize that the different pixel islands can be scanned in different scanning modes is that the display device further includes a plurality of switch components 7, and the switch components 7 are arranged in a one-to-one correspondence with the pixel islands 11. The switch component 7 includes a plurality of switch units 71, and the number of the switch units 71 may be the same as the number of columns of sub-pixel units in the pixel island 11, and the sub-pixel units in the same column in the pixel island 11 are connected to a data line Data through one of the switch units 71. Herein, the data line Data is connected to a source driving circuit, and is configured to transmit the data signal output by the source driving circuit to the sub-pixel unit. The switch unit 71 is configured to, in response to a control signal, connect the data line Data and the same column of sub-pixel units P in the pixel island 11. As shown in FIG. 5, the same row of sub-pixel units in the display device can be commonly connected to a gate line Gate1, Gate2 . . . , and the gate line is configured to transmit the gate driving signal provided by the gate driving chip to the sub-pixel unit. The display device can be realized in such a way that different pixel islands can be scanned in different scanning modes by controlling the switch components 7. For example, as shown in FIG. 5, when the display device needs to scan the upper left pixel islands in FIG. 5, all the switch units 71 in the switch components 7 corresponding to the upper left pixel islands can be turned on, and the gate lines Gate 1 and Gage 2 can be provided with gate driving signals row by row. When the display device needs to scan the upper right pixel islands in multiple rows at the same time, all the switch units 71 in the switch components 7 corresponding to the upper right pixel islands can be turned on, and the gate lines Gate1 and Gate2 can be provided with gate driving signals at the same time. It should be noted that the exemplary embodiments are described by taking only an example that the pixel island includes 2*2 sub-pixel units. In other exemplary embodiments, the pixel island may also include other numbers of sub-pixel units.

In some exemplary embodiments, during scanning of one frame, the gate driving chip can provide gate driving signals to the sub-pixel units connected thereto in any order. For example, during scanning of one frame, the gate driving chip may first provide gate driving signals to the sub-pixel units in the gaze area, so that the sub-pixel units in the gaze area are scanned first. In this way, the display device is enabled to adjust the scanning mode in the gaze area in time when the position of the gaze area changes, thereby improving the display effect.

In some exemplary embodiments, as shown in FIG. 3, the display device further includes a source driving circuit 8. The source driving circuit 8 is configured to output a data signal according to a pixel value. In some exemplary embodiments, the source driving circuit 8 is configured to, during the scanning stage of sub-pixel units in the gaze area, provide data signals to a column of sub-pixel units in the gaze area according to a pixel value and, during the scanning stage of sub-pixel units in the non-gaze area, provide a same data signal to multiple columns of sub-pixel units in the non-gaze area according to a pixel value. In other words, during the scanning stage of the sub-pixel units in the gaze area, the data signals received by the sub-pixel units of different columns may correspond to different pixel values, respectively, and the sub-pixel units of the multiple columns may display different gray levels or the same gray level. During the scanning stage of the sub-pixel units in the non-gaze area, the data signals received by the sub-pixel units of different columns can only correspond to one pixel value, and the sub-pixel units of the multiple columns can only display the same gray scale. In this way, only the amount of pixel value data in the non-gaze area is reduced, so that the amount of data transmission within the display device can be reduced under the premise of ensuring a certain display effect, thereby reducing the power consumption of the display device.

Figure 6:
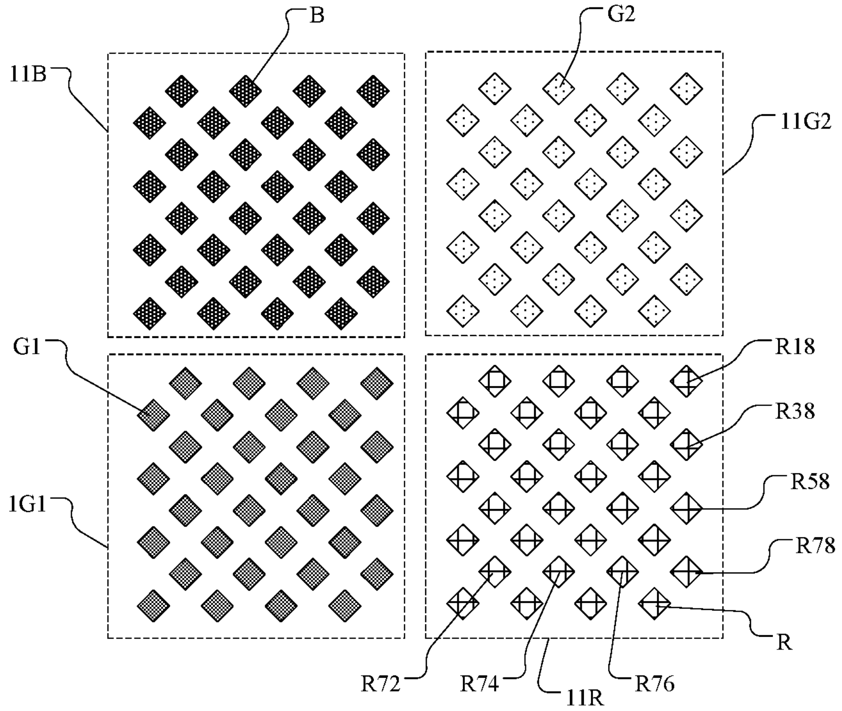
FIG. 6 is a schematic diagram illustrating a structure of pixel island groups in the display device according to some exemplary embodiments of the disclosure.

In some exemplary embodiments, as shown in FIG. 6, it is a schematic diagram illustrating a structure of pixel island groups in the display device according to some exemplary embodiments of the disclosure. The pixel island group 1 includes R pixel island 11R, B pixel island 11B, first G pixel island 11G1, and second G pixel island 11G2. form the aforementioned pixel islands may be formed by the R pixel island 11R, B pixel island 11B, first G pixel island 11G1, and the second G pixel islands 11G2, respectively. The R pixel island 11R includes R sub-pixel units R in 8 rows and 8 columns, wherein an R sub-pixel unit in the X-th row and Y-th column is located in the same column as an R sub-pixel unit in the (X+2)-th row and Y-th column, and the R sub-pixel unit in the X-th row and Y-th column is located in the same row as an R sub-pixel unit in the X-th row and (Y+2)-th column. That is, the R sub-pixel units of adjacent rows are offset by one sub-pixel unit in the row direction, and the R sub-pixel units of adjacent columns are offset by one sub-pixel unit in the column direction. For example, as shown in FIG. 6, the R sub-pixel unit R18 in the first row and the eighth column, the R sub-pixel unit R38 in the third row and the eighth column, the R sub-pixel unit R58 in the fifth row and the eighth column, and the R sub-pixel unit R78 in the seventh row and the eighth column are located in the same column; the R sub-pixel unit R72 in the seventh row and the second column, the R sub-pixel unit R74 in the seventh row and the fourth column, the R sub-pixel unit R76 in the seventh row and the sixth column, and the R sub-pixel unit R78 in the seventh row and the eighth column are located in the same row. The B pixel island includes B sub-pixel units B in 8 rows and 8 columns, wherein a B sub-pixel unit in the X-th row and Y-th column is located in the same column as a B sub-pixel unit in the (X+2)-th row and Y-th column, and the B sub-pixel unit in the X-th row and Y-th column is located in the same row as a B sub-pixel unit in the X-th row and (Y+2)-th column, where X and Y are positive integers greater than or equal to 1. In other words, the arrangement structure of the B sub-pixel units in the B pixel island can be the same as the R sub-pixel units in the R pixel island. The first G pixel island includes first G sub-pixel units in 8 rows and 8 columns, wherein a first G sub-pixel unit in the X-th row and Y-th column is located in the same column as a first G sub-pixel unit in the (X+2)-th row and Y-th column, and the first G sub-pixel unit in the X-th row and Y-th column is located in the same row as a first G sub-pixel unit in the X-th row and (Y+2)-th column, where X and Y are positive integers greater than or equal to 1. In other words, the arrangement structure of the first G sub-pixel units in the first G pixel island can be the same as the R sub-pixel units in the R pixel island. The second G pixel island includes second G sub-pixel units in 8 rows and 8 columns, wherein a second G sub-pixel unit in the X-th row and Y-th column is located in the same column as a second G sub-pixel unit in the (X+2)-th row and Y-th column, and the second G sub-pixel unit in the X-th row and Y-th column is located in the same row as a second G sub-pixel unit in the X-th row and (Y+2)-th column, where X and Y are positive integers greater than or equal to 1. In other words, the arrangement structure of the second G sub-pixel units in the second G pixel island can be the same as the R sub-pixel units in the R pixel island.

As shown in FIG. 6, the R pixel island 11R, the B pixel island 11B, the first G pixel island 11G1, and the second G pixel island 11G2 may be distributed in a 2*2 matrix. It should be understood that, in other exemplary embodiments, the R pixel island 11R, the B pixel island 11B, the first G pixel island 11G1, and the second G pixel island 11G2 may also be distributed in other relative positional relationships. For example, the R pixel island 11R, the B pixel island 11B, the first G pixel island 11G1, and the second G pixel island 11G2 may be sequentially distributed along one direction. In addition, when the R pixel island 11R, the B pixel island 11B, the first G pixel island 11G1 and the second G pixel island 11G2 are distributed in a 2*2 matrix, the R pixel island 11R, the B pixel island 11B, the first G pixel island 11G1, and the second G pixel islands 11G2 can also be distributed in other relative positional relationships. For example, the first G pixel island 11G1 and the second G pixel island 11G2 can be located in the same row, and the R pixel island 11R and B pixel island 11B are located in the same row.

Figure 7:
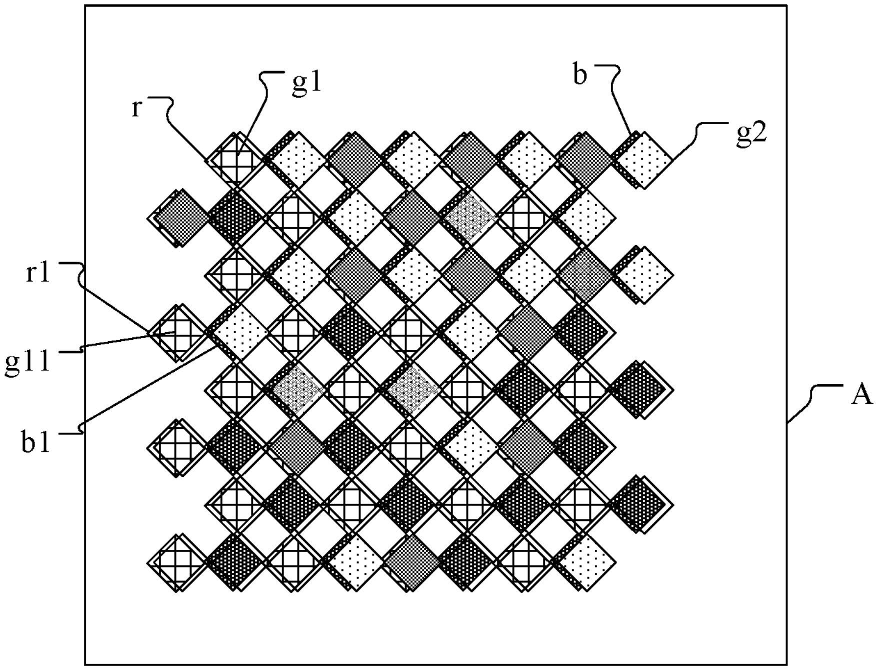
FIG. 7 is a schematic diagram illustrating a structure of the virtual image corresponding to the pixel island groups in the display device according to some exemplary embodiments of the disclosure.

In some exemplary embodiments, as shown in FIG. 7, it is a schematic diagram illustrating a structure of the virtual image corresponding to the pixel island groups in the display device according to some exemplary embodiments of the disclosure. The R sub-pixel units in 8 rows and 8 columns can be imaged to the preset virtual image plane by their corresponding lenses to form 8 rows and 8 columns of R virtual image units r. The B sub-pixel units in 8 rows and 8 columns imaged to the preset virtual image plane by their corresponding lenses to form 8 rows and 8 columns of B virtual image unit b. The 8 rows and 8 columns of the first G sub-pixel unit G1 can be imaged by their corresponding lens to the preset virtual image plane to form 8 rows and 8 columns of first G virtual image unit g1. The 8 rows and 8 columns of the second G sub-pixel unit G2 can be imaged by their corresponding lens to the preset virtual image plane to form 8 rows and 8 columns of second G virtual image unit g2. Herein, as shown in FIG. 7, in the virtual images formed by the R pixel island and the B pixel island, along each of the row and column directions, any R virtual image unit r is only adjacent to the B virtual image unit(s) b, and any B virtual image unit b is only adjacent to the R virtual image unit(s) r. In the virtual images formed by the first G pixel island and the second G pixel island, along each of the row and column directions, any first G virtual image unit g1 is only adjacent to the second G virtual image unit(s) g2, and any second G virtual image unit g2 is only adjacent to the first G virtual image unit(s) g1. In addition, the first G virtual image units g1 may be arranged in a one-to-one correspondence with the R virtual image units r, and any first G virtual image unit g1 may at least partially overlap with its corresponding R virtual image unit r. The G virtual image units g2 may be arranged in a one-to-one correspondence with the B virtual image units b, and any second G virtual image unit g2 may at least partially overlap with its corresponding B virtual image unit b.

As shown in FIG. 7, in some embodiments, a green virtual image unit (the first G virtual image unit g1 or the second G virtual image unit g2) can be regarded as the center of a pixel unit, and two pixel units can share one R virtual image unit r or share one B virtual image unit b. For example, as shown in FIG. 7, a R virtual image unit r1 and its corresponding first G virtual image unit g11 share the B virtual image unit b1 to form one pixel unit. According to the display device provided by this exemplary embodiment, the number of B sub-pixel units B and R sub-pixel units R can be reduced by sharing the B virtual image unit b and the R virtual image unit r. In this way, the number of data signal transmissions can be further reduced, thereby facilitating the improvement of the refresh frequency of the display device.

As shown in FIG. 7, in the first G virtual image unit g1 and its corresponding R virtual image unit r, the first G virtual image unit g1 is offset to the right with respect to the R virtual image unit r. In the second G virtual image unit g2 and its corresponding B virtual image unit b, the second G virtual image unit g2 is offset to the right with respect to the B virtual image unit b. It should be understood that, in other exemplary embodiments, in the first G virtual image unit g1 and its corresponding R virtual image unit r, the first G virtual image unit g1 and the R virtual image unit r may completely overlap, or the first G virtual image unit g1 may be offset in other directions relative to the R virtual image unit r. In the second G virtual image unit g2 and its corresponding B virtual image unit b, the second G virtual image unit g2 and the B virtual image unit b may completely overlap, or the second G virtual image unit g2 may be offset in other directions relative to the B virtual image unit b. In other exemplary embodiments, the R pixel island 11R may further include other numbers of sub-pixel units. The B pixel island 11B may also include other numbers of sub-pixel units. The first G pixel island 11G1 may also include other numbers of sub-pixel units. The second G pixel island 11G2 may also include other numbers of sub-pixel units.

In some exemplary embodiments, as shown in FIG. 3, the display device further includes a data acquisition unit 9 and a processing unit 10. The data acquisition unit 9 is configured to acquire RGB image data, and the RGB image data includes first image data corresponding to the gaze area and second image data corresponding to the non-gaze area. The processing unit 10 is configured to generate pixel values corresponding to sub-pixel units in the gaze area according to the first image data, and generate pixel values corresponding to sub-pixel units in the non-gaze area according to the second image data. In some exemplary embodiments, the RGB image data may correspond to a plurality of RBG pixels distributed in an array, and each RBG pixel includes an R sub-pixel, a G sub-pixel, and a B sub-pixel.

In some exemplary embodiments, generating the pixel values corresponding to sub-pixel units in the gaze are according to the first image data includes following steps.

In step S1, according to a position of a target sub-pixel unit in the gaze area, a key sub-pixel corresponding to the target sub-pixel unit and at least one relevant sub-pixel are acquired in the RGB image data, wherein the relevant sub-pixel is located around the key sub-pixel, and the relevant sub-pixel, the key sub-pixel, and the target sub-pixel unit may correspond to the same color.

In step S2, a pixel value of the target sub-pixel unit is acquired according to a pixel value of the key sub-pixel and a pixel value of the relevant sub-pixel.

In the following exemplary embodiments, a single pixel island group is taken as an example to describe in detail how to acquire the pixel value corresponding to the sub-pixel unit in the gaze area according to the first image data.

Figure 8:
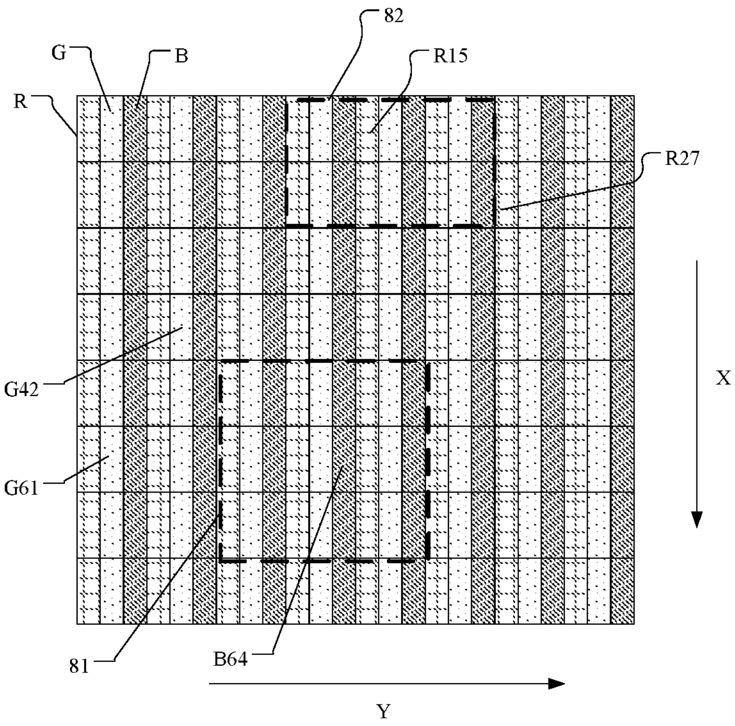
FIG. 8 is a pixel distribution diagram corresponding to first image data.
Figure 9:
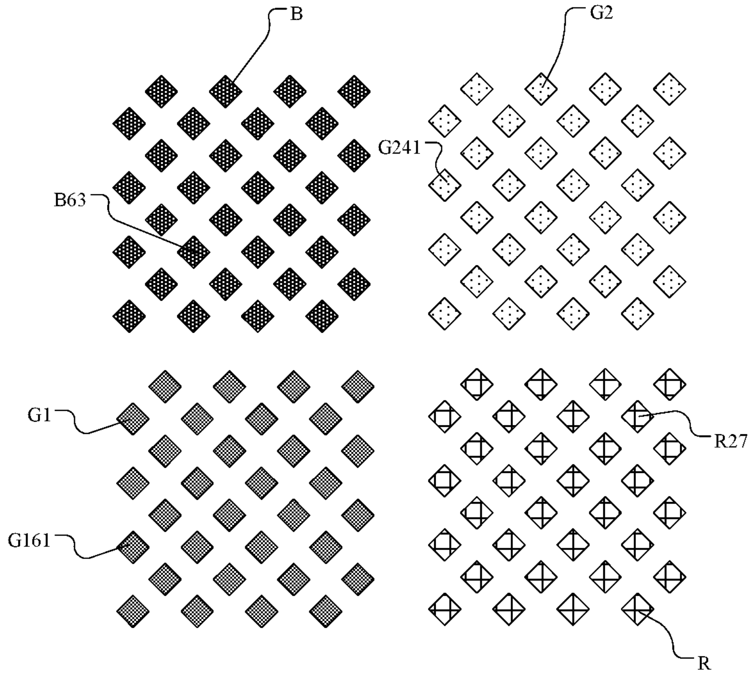
FIG. 9 is a schematic diagram illustrating a structure of one pixel island group.
Figure 10:
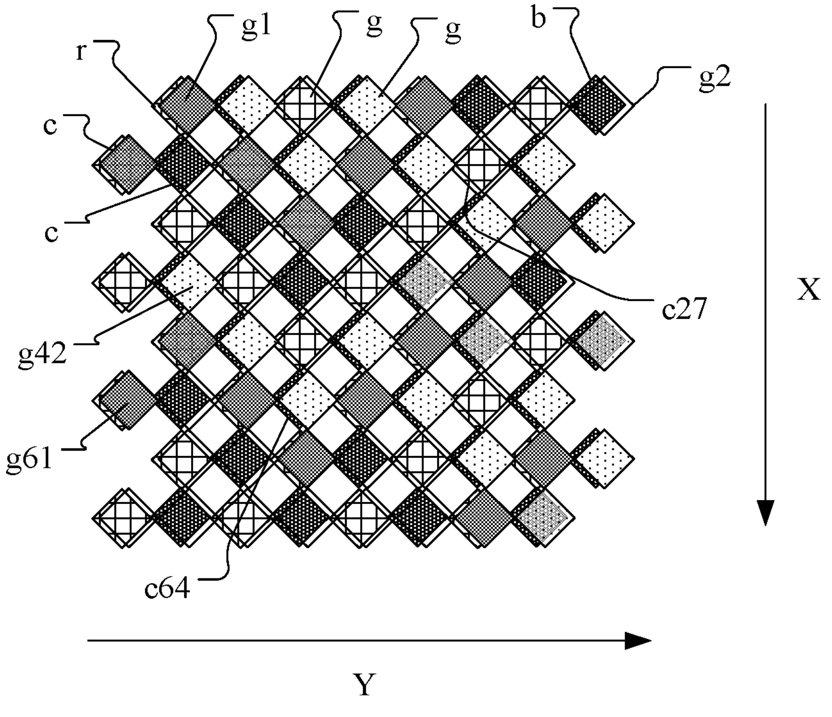
FIG. 10 is a schematic diagram illustrating a structure of the virtual image corresponding to the pixel island group in FIG. 9.

As shown in FIG. 8, FIG. 9, and FIG. 10, FIG. 8 is a pixel distribution diagram corresponding to first image data, and FIG. 9 is a schematic diagram illustrating a structure of one pixel island group, and FIG. 10 is a schematic diagram illustrating a structure of the virtual image corresponding to the pixel island group in FIG. 9. The display device provided by the exemplary embodiments can acquire the pixel value of any sub-pixel unit in FIG. 9 according to the first image data shown in FIG. 8. Herein, as shown in FIG. 8, the first image data may correspond to 8*8 RGB pixels distributed in rows and columns, and each RBG pixel includes an R sub-pixel R, a G sub-pixel G, and a B sub-pixel B. As shown in FIG. 9, the pixel island group structure in FIG. 9 may be the same as the pixel island group structure in FIG. 6, and the virtual image structure in FIG. 10 may be the same as the virtual image structure in FIG. 7. As shown in FIG. 10, the first G virtual image unit g1 and the second G virtual image unit g2 may form 8 rows of first virtual image units g, and each row of the first virtual image unit g may include 8 first virtual image units g. The R virtual image unit r and the B virtual image unit b may form 8 rows of second virtual image units c, and each row of the second virtual image units c may include 8 second virtual image units c.

In some exemplary embodiments, acquiring the key sub-pixel corresponding to the target sub-pixel unit in the RGB image data according to the position of the target sub-pixel unit in the gaze are may include following steps. The key sub-pixel corresponding to the target sub-pixel unit is acquired from the RGB image data according to a preset rule. In some exemplary embodiments, the preset rule includes, when the target sub-pixel unit corresponds to the X-th row and Y-th column of first virtual image unit g, the key sub-pixel is located in the X-th row and Y-th column of the RGB image data. For example, as shown in FIG. 9, when the target sub-pixel unit is G241, the target sub-pixel unit G241 corresponds to the first virtual image unit g42 in FIG. 10. In FIG. 8, the key sub-pixel corresponding to the target sub-pixel unit G241 is the G sub-pixel located in the fourth row and the second column of the pixel units in FIG. 8, that is, the G sub-pixel G42 in FIG. 8. For another example, as shown in FIG. 9, when the target sub-pixel unit is G161, the target sub-pixel unit G161 corresponds to the first virtual image unit g61 in FIG. 10, where the first virtual image unit g61 is located in the sixth row and first column of the first virtual image unit array. In FIG. 8, the key sub-pixel corresponding to the target sub-pixel unit G161 is the G sub-pixel located in the sixth row and the first column of the pixel units in FIG. 8, that is, the G sub-pixel G61 in FIG. 8.

It should be noted that, as shown in FIG. 8 and FIG. 10, when the virtual image frame and the first image data are displayed on the same plane, the first virtual image unit g in the (X+1)-th row is located at one side, in the first direction X, of the first virtual image unit g in the X-th row, and the RGB pixels in the (X+1)-th row is also located at the side, in the first direction X, of the RGB pixels in the X-th row. For example, as shown in FIG. 8 and FIG. 10, the first virtual image unit g in the second row is located at one side, in the first direction X, of the first virtual image unit g in the first row, and the RGB pixels in the third row are also located at the side, in the first direction X, of the RGB pixels in the second row. Herein, the first direction X may be a vertical downward direction. As shown in FIG. 8 and FIG. 10, when the virtual image frame and the first image data are displayed on the same plane, the (X+1)-th first virtual image unit g is located at one side, in the second direction Y, of the X-th first virtual image unit g, and the (X+1)-th column of RGB pixels are also located at the side of the X-th column of RGB pixels in the second direction Y. For example, as shown in FIG. 8 and FIG. 10, the second one of first virtual image unit g in the first row is located at one side, in the second direction Y, of the first one in the first row of the first virtual image units g, and the RGB pixels in the third column are located at one side, in the second direction Y, of the RGB pixels in the second column. Herein, the second direction Y may be a horizontal rightward direction.

The preset rule may further include, when the target sub-pixel unit corresponds to the Y-th one at the X-th row of the second virtual image units, the key sub-pixel is located in the X-th row and Y-th column of the RGB image data. For example, as shown in FIG. 9, when the target sub-pixel unit is R27, the target sub-pixel unit R27 corresponds to the second virtual image unit c27 in FIG. 10, wherein the second virtual image unit c27 is the seventh one at the second row of the array of second virtual image units. In FIG. 8, the key sub-pixel corresponding to the target sub-pixel unit R27 is the R sub-pixel located in the second row and the seventh column of pixel units in FIG. 8, that is, the R sub-pixel R27 in FIG. 8. For another example, as shown in FIG. 9, when the target sub-pixel unit is B63, the target sub-pixel unit B63 corresponds to the second virtual image unit c64 in FIG. 10, where the second virtual image unit c64 is the fourth one at the sixth row of the array of the second virtual image units. In FIG. 8, the key sub-pixel corresponding to the target sub-pixel unit B63 is the B sub-pixel located in the sixth row and the fourth column of pixel units in FIG. 8, that is, the B sub-pixel B64 in FIG. 8.

It should be noted that, as shown in FIG. 8 and FIG. 10, when the virtual image frame and the first image data are displayed on the same plane, the second virtual image unit c in the (X+1)-th row is located at one side, in the first direction X, of the second virtual image unit c in the X-th row, and the RGB pixels in the (X+1)-th row is also located at the side, in the first direction X, of the RGB pixels in the X-th row. For example, as shown in FIG. 8 and FIG. 10, the second virtual image unit c in the second row is located at one side, in the first direction X, of the second virtual image unit c in the first row, and the RGB pixels in the third row are also located at the side, in the first direction X, of the RGB pixels in the second row. Herein, the first direction X may be a vertical downward direction. As shown in FIG. 8 and FIG. 10, when the virtual image frame and the first image data are displayed on the same plane, the (X+1)-th second virtual image unit c is located at one side, in the second direction Y, of the X-th second virtual image unit c, and the (X+1)-th column of RGB pixels are also located at the side of the X-th column of RGB pixels in the second direction Y. For example, as shown in FIG. 8 and FIG. 10, the second one of second virtual image unit c in the first row is located at one side, in the second direction Y, of the first one in the first row of the second virtual image units c, and the RGB pixels in the third column are located at one side, in the second direction Y, of the RGB pixels in the second column. Herein, the second direction Y may be a horizontal rightward direction.

In some exemplary embodiments, acquiring the pixel value of the target sub-pixel unit according to the pixel value of the key sub-pixel and the pixel value of the relevant sub-pixel may include following steps:

acquiring, according to the pixel value of the key sub-pixel and the pixel value of the relevant sub-pixel, a weight of the key sub-pixel to the pixel value of the target sub-pixel unit, and a weight of the relevant sub-pixel to the pixel value of the target sub-pixel unit; and acquiring the pixel value of the target sub-pixel unit according to the pixel value of the key sub-pixel, the pixel value of the relevant sub-pixel, the weight of the key sub-pixel, and the weight of the relevant sub-pixel.

Herein, the pixel value of the target sub-pixel unit is calculated based on $h=\Sigma_{k=1}^{n}(h_k a_k)+h_x a_x$, where $h_x$ represents the pixel value of the key sub-pixel, $a_x$ represents the weight of the key sub-pixel, $h_k$ represents the pixel value of the relevant sub-pixel, $a_k$ represents the weight of the relevant sub-pixel, and n is greater than or equal to 1.

In some exemplary embodiments, the weight of the key sub-pixel to the pixel value of the target sub-pixel unit and the weight of the relevant sub-pixel to the pixel value of the target sub-pixel unit are obtained according to the pixel value of the key sub-pixel and the pixel value of the relevant sub-pixel through following steps.

First, an average value of the pixel value of the key sub-pixel and the pixel value of the relevant sub-pixel is calculated. Then, the weight of the key sub-pixel to the pixel value of the target sub-pixel unit and the weight of the relevant sub-pixel to the pixel value of the target sub-pixel unit are obtained according to the average value based on a preset determination rule. The preset determination rule may include, comparing the average value as calculated with a threshold value, and obtaining a set of corresponding weight values according to the comparison between the average value and the threshold value. The set of weight values includes the weight of the key sub-pixel to the pixel value of the target sub-pixel unit, and the weight of the relevant sub-pixel to the pixel value of the target sub-pixel unit.

In some exemplary embodiments, there may be a plurality of relevant sub-pixels, and the key sub-pixel and the plurality of relevant sub-pixels may be distributed in an array. For example, the key sub-pixel and the plurality of relevant sub-pixels are distributed in a 3*3 array, and the key sub-pixel may be located at the center of the array. For example, as shown in FIG. 8, the relevant sub-pixels corresponding to the key sub-pixel B64 include the remaining eight B sub-pixels in the dashed frame 81. It should be noted that when the key sub-pixel is located at a boundary of the pixel structure corresponding to the RGB image data, the key sub-pixel may be located at the edge of the array. For example, when the key sub-pixel is the R sub-pixel R15, the array may be located at the position of the dashed frame 82, and the relevant sub-pixels corresponding to the key sub-pixel R15 may include the remaining five B sub-pixels in the dashed frame 82.

In some exemplary embodiments, when the key sub-pixel and the plurality of relevant sub-pixels are distributed in a 3*3 array, the above-mentioned preset determination rule may be that, when the target sub-pixel unit is a G sub-pixel unit, the weight corresponding to the key sub-pixel is 1, and the weight corresponding to other relevant sub-pixels is 0; and when the target sub-pixel unit is an R sub-pixel unit or a B sub-pixel unit, the weight corresponding to the key sub-pixel is 0.2, and the weight corresponding to other relevant sub-pixels is 0.1.

Figure 11:
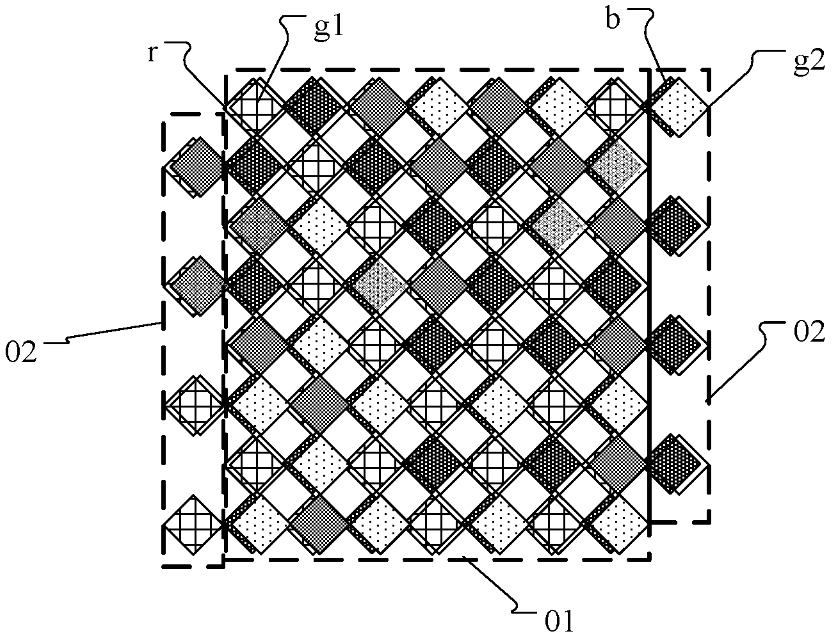
FIG. 11 is a schematic diagram illustrating a virtual image corresponding to the display device of the disclosure.

As shown in FIG. 11, it is a schematic diagram illustrating a virtual image corresponding to the display device of the disclosure. In a virtual image frame corresponding to a pixel island group, the virtual image frame may include a central area 01 and a border area 02. The density of virtual image units in the border area 02 is less than the density of virtual image units in the central area 01. The virtual image units in the border 02 may correspond to the first sub-pixel units in the pixel island group. The processing unit is further configured to set the pixel value corresponding to the first sub-pixel unit to 0 grayscale. In this way, the virtual image frame can be formed as a regular rectangular structure, thereby improving the display effect.

Figure 12:
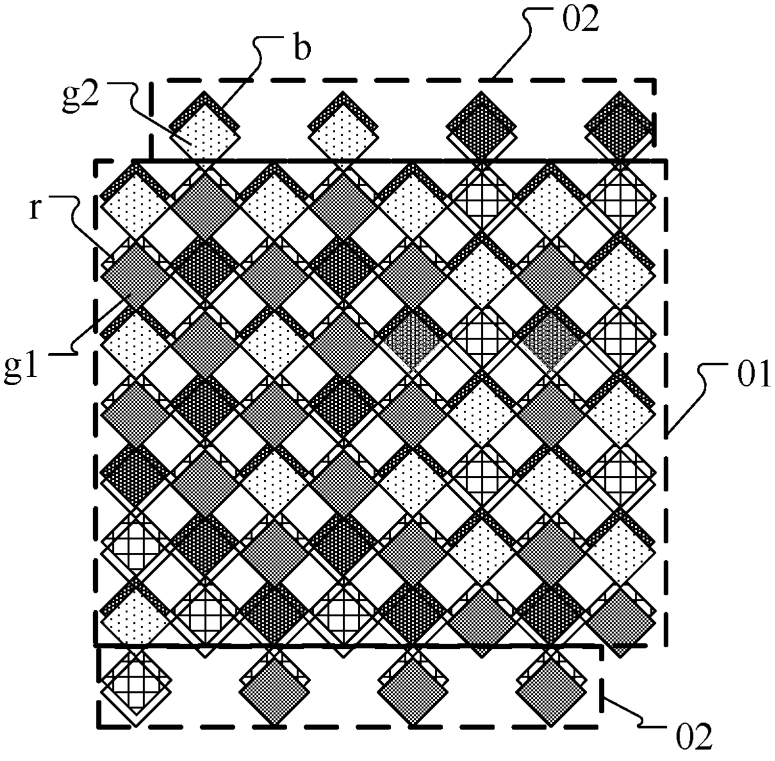
FIG. 12 illustrates a border area 02 located on the upper and lower sides of the central area 01.

As shown in FIG. 11, the border area 02 is located at the left and right sides of the central area 01. It should be understood that in other exemplary embodiments, when the relative positions of the R virtual image unit, the B virtual image unit, the first G virtual image unit, and the second G virtual image unit change, the position of the border area 02 will also change accordingly. For example, as shown in FIG. 12, the border area 02 is located at the upper and lower sides of the central area 01.

In some exemplary embodiments, generating the pixel value corresponding to the sub-pixel unit in the non-gaze area according to the second image data includes following steps:

acquiring, from the RGB image data, a key sub-pixel corresponding to a target sub-pixel unit according to a position of the target sub-pixel unit in the non-gaze area; and acquiring a pixel value of the key sub-pixel as the pixel value of the target sub-pixel unit.

In some exemplary embodiments, the acquiring, from the RGB image data, a key sub-pixel corresponding to a target sub-pixel unit according to a position of the target sub-pixel unit in the non-gaze area can be achieved in a same way as the forgoing acquiring, from the RGB image data, a key sub-pixel corresponding to a target sub-pixel unit according to a position of the target sub-pixel unit in the gaze area.

A specific example is described below.

Figure 13:
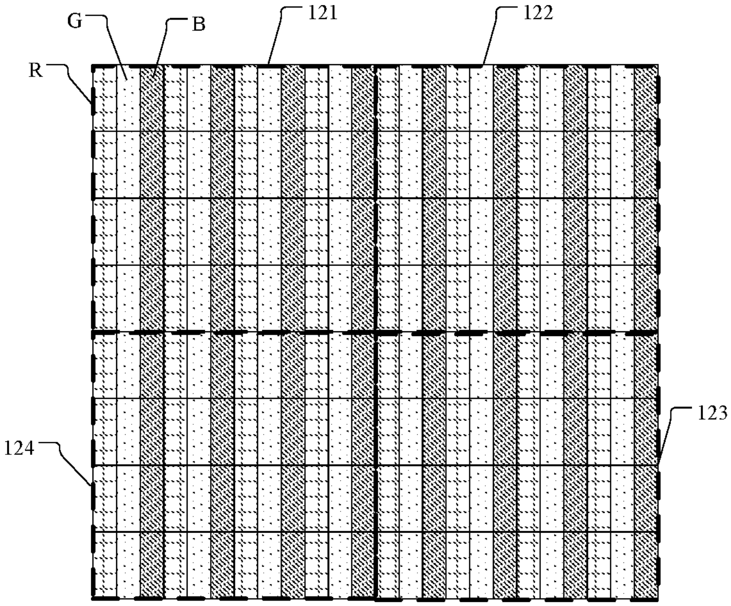
FIG. 13 is a pixel distribution diagram corresponding to second image data.

As shown in FIG. 13, it is a pixel distribution diagram corresponding to second image data. Herein, the pixel structure corresponding to the second image data includes 8*8 RGB pixels. Among them, the rectangular dashed frames 121, 122, 123, 124 in FIG. 13 separate the pixel structure corresponding to the second image data into 2*2 structures, with each dashed frame including 4*4 RGB pixels. In some exemplary embodiments, the sub-pixels of the same color in each dashed frame share one pixel value.

Figure 14:
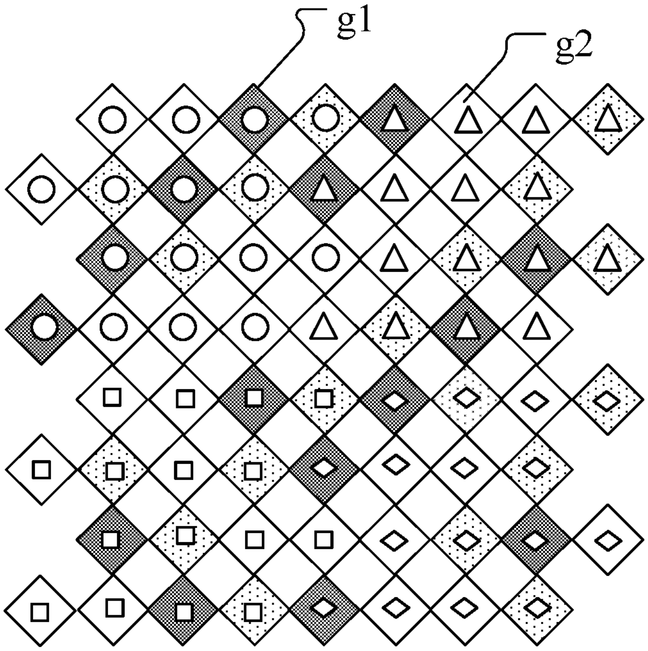
FIG. 14 is a schematic diagram illustrating a partial structure of the virtual image corresponding to the display device of the disclosure.

As shown in FIG. 14, it is a schematic diagram illustrating a partial structure of the virtual image corresponding to the display device of the disclosure. FIG. 13 shows a schematic diagram of the structure of the first G virtual image unit g1 and the second G virtual image unit g2. In some exemplary embodiments, when the sub-pixel units in the non-gaze area are scanned, the sub-pixel units corresponding to the virtual image unit with a circular mark share one pixel value, and the key sub-pixels corresponding to the virtual image unit with the circular mark are all located within the dashed frame 121 in FIG. 13. Therefore, the shared pixel value can be equal to the pixel value of the G sub-pixel in the dashed frame 121. Similarly, the sub-pixel units corresponding to the virtual image unit with a triangle mark share one pixel value, and the key sub-pixels corresponding to the virtual image unit with the triangle mark are all located within the dashed frame 122 in FIG. 13, so the shared pixel value can be equal to the pixel value of the G sub-pixel in the dashed frame 122. Similarly, the sub-pixel units corresponding to the virtual image unit with a square mark share one pixel value, and the key sub-pixels corresponding to the virtual image unit with the square mark are all located within the dashed frame 124 in FIG. 13, so the shared pixel value can be equal to the pixel value of the G sub-pixel in the dashed frame 124. Similarly, the sub-pixel units corresponding to the virtual image unit with a diamond mark share one pixel value, and the key sub-pixels corresponding to the virtual image unit with the diamond mark are all located within the dashed box 123 in FIG. 13, so the shared pixel value can be equal to the pixel value of the G sub-pixel in the dashed frame 123.

Figure 15:
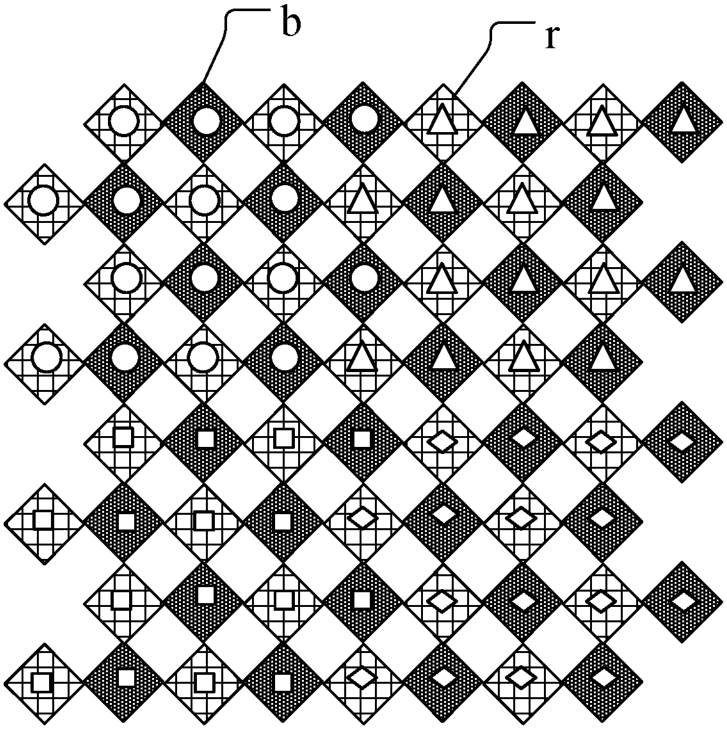
FIG. 15 is a schematic diagram illustrating a partial structure of the virtual image corresponding to the display device of the disclosure.

As shown in FIG. 15, it is a schematic diagram illustrating a partial structure of the virtual image corresponding to the display device of the disclosure. FIG. 13 shows a schematic diagram of the structure of the R virtual image unit r and the B virtual image unit b. In some exemplary embodiments, when the sub-pixel units in the non-gaze area are scanned, the sub-pixel units corresponding to the R virtual image unit r with a circular mark share one pixel value, and the key sub-pixels corresponding to the virtual image unit r with the circular mark are all located within the dashed frame 121 in FIG. 13, so the shared pixel value can be equal to the pixel value of the R sub-pixel in the dashed frame 121. Similarly, the sub-pixel units corresponding to the R virtual image unit r with a triangle mark can share one pixel value, and the shared pixel value may be equal to the pixel value of the R sub-pixel in the dashed frame 122. The sub-pixel units corresponding to the R virtual image unit r with a square mark can share one pixel value, and the shared pixel value may be equal to the pixel value of the R sub-pixel in the dashed frame 124. The sub-pixel units corresponding to the R virtual image unit r with a diamond mark can share one pixel value, and the shared pixel value may be equal to the pixel value of the R sub-pixel in the dashed frame 123. When the sub-pixel units in the non-gaze area are scanned, the sub-pixel units corresponding to the B virtual image unit b with a circular mark can share one pixel value, and the shared pixel value may be equal to the pixel value of the B sub-pixel in the dashed frame 121. The sub-pixel units corresponding to the B virtual image unit b with a triangle mark can share one pixel value, and the shared pixel value may be equal to the pixel value of the B sub-pixel in the dashed frame 122. The sub-pixel units corresponding to the B virtual image unit b with a square mark can share one pixel value, and the shared pixel value may be equal to the pixel value of the B sub-pixel in the dashed frame 124. The sub-pixel units corresponding to the B virtual image unit b with a diamond mark can share one pixel value, and the shared pixel value may be equal to the pixel value of the B sub-pixel in the dashed frame 123.

The display device provided according to the exemplary embodiments may be a VR display device and an AR display device. In some embodiments, the light-emitting unit of the display device may be a silicon-based OLED.

Exemplary embodiments also provide a method for driving a display device. The display device includes a plurality of pixel island groups and a plurality of lenses. The plurality of pixel island groups are arranged in array, wherein each of the pixel island groups includes a plurality of pixel islands, each of the pixel islands includes a plurality of sub-pixel units of a same color arranged in array, and different pixel islands are able to be scanned in different scanning modes. The plurality of lenses are arranged in a one-to-one correspondence with the pixel islands, and configured to image corresponding pixel islands to a preset virtual image plane. The driving method may include following steps:

determining a gaze area and a non-gaze area according to gazed coordinates of human eye, wherein N pixel island groups are provided in the gaze area, and N is a positive integer greater than or equal to 1;

providing, at a scanning stage of the sub-pixel units in the gaze area, gate driving signals to the sub-pixel units in the gaze area row by row; and providing, at a scanning stage of the sub-pixel units in the non-gaze area, gate driving signals simultaneously to multiple adjacent rows of sub-pixel units in the non-gaze area.

In some exemplary embodiments, the display device further includes a gate driving chip configured to, during scanning of one frame, provide gate driving signals to the sub-pixel units connected thereto in any order; and the method further includes:

providing, through the gate driving chip during scanning of one frame, gate driving signals to the sub-pixel units in the gaze area first.

The driving method of the display device has been described in detail in the above description, and will not be repeated here.

Those skilled in the art will easily think of other embodiments of the present disclosure after considering the specification and practicing the content disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are pointed out by the claims.

It should be understood that the disclosure is not limited to the precise structure that has been described above and shown in the drawings, and various modifications and changes can be made without departing from its scope. The scope of the disclosure is limited only by the appended claims.

What is claimed is:

1. A display device, comprising:

a plurality of pixel island groups arranged in array, wherein each of the pixel island groups comprises a plurality of pixel islands, each of the pixel islands comprises a plurality of sub-pixel units of a same color arranged in array, and different pixel islands are able to be scanned in different scanning modes, wherein N pixel island groups are provided in a gaze area, N is a positive integer greater than or equal to 1, and the gaze area and a non-gaze area are determined according to gazed coordinates of human eye;

a plurality of lenses arranged in a one-to-one correspondence with the pixel islands, configured to image corresponding pixel islands to a preset virtual image plane;

wherein sub-pixel units in the gaze area are provided with gate driving signals in a first driving manner during a scanning stage of the sub-pixel units in the gaze area, and sub-pixel units in the non-gaze area are simultaneously provided with gate driving signals in a second driving manner during a scanning stage of the sub-pixel units in the non-gaze area, wherein a gate driving signal is independently provided to a corresponding pixel island, and wherein the display device further comprises a plurality of switch components arranged in a one-to-one correspondence with the pixel islands, wherein each of the switch components comprises a plurality of switch units, a number of the switch units is the same as a number of columns of sub-pixel units in the pixel island, the sub-pixel units in a same column in the pixel island are connected to a data line through one of the switch units, and the switch unit is configured to connect the data line with the sub-pixel units in the same column in the pixel island in response to a control signal.

2. The display device of claim 1, wherein the first driving manner comprises: gate driving signals are provided to the sub-pixel units in the gaze area row by row; and the second driving manner comprises: gate driving signals are provided to the sub-pixel units in multiple rows of the gaze area simultaneously.

3. The display device of claim 1, wherein, during scanning of one frame, gate driving signals are able to be provided to the sub-pixel units in any order; and during scanning of one frame, gate driving signals are provided to the sub-pixel units in the gaze area.

4. The display device of claim 1, further comprising:

a source driving circuit, configured to output data signals according to pixel values;

wherein, the source driving circuit is configured to provide a data signal to a column of sub-pixel units in the gaze area according to a pixel value during the scanning stage of the sub-pixel units in the gaze area, and provide a data signal to multiple columns of sub-pixel units in the non-gaze area according to a pixel value during the scanning stage of the sub-pixel units in the non-gaze area.

5. The display device of claim 4, wherein the pixel island groups comprise:

an R pixel island, comprising N1 rows and M1 columns of R sub-pixel units, wherein the R sub-pixel units in X-th row and Y-th column and the R sub-pixel units in (X+2)-th row and Y-th column are located in a same column, and the R sub-pixel units in X-th row and Y-th column and the R sub-pixel units in X-th row and (Y+2)-th column are located in a same row, where X is a positive integer greater than or equal to 1 and less than or equal to N1-2, and Y is a positive integer greater than or equal to 1 and less than or equal to M1-2;

a B pixel island, comprising N1 rows and M1 columns of B sub-pixel units, wherein the B sub-pixel units in X-th row and Y-th column and the B sub-pixel units in (X+2)-th row and Y-th column are located in a same column, and the B sub-pixel units in X-th row and Y-th column and the B sub-pixel units in X-th row and (Y+2)-th column are located in a same row, where X is a positive integer greater than or equal to 1 and less than or equal to N1-2, and Y is a positive integer greater than or equal to 1 and less than or equal to M1-2;

a first G pixel island, comprising N1 rows and M1 columns of first G sub-pixel units, wherein the first G sub-pixel units in X-th row and Y-th column and the first G sub-pixel units in (X+2)-th row and Y-th column are located in a same column, and the first G sub-pixel units in X-th row and Y-th column and the first G sub-pixel units in X-th row and (Y+2)-th column are located in a same row, where X is a positive integer greater than or equal to 1 and less than or equal to N1-2, and Y is a positive integer greater than or equal to 1 and less than or equal to M1-2;

a second G pixel island, comprising N1 rows and M1 columns of second G sub-pixel units, wherein the second G sub-pixel units in X-th row and Y-th column and the second G sub-pixel units in (X+2)-th row and Y-th column are located in a same column, and the second G sub-pixel units in X-th row and Y-th column and the second G sub-pixel units in X-th row and (Y+2)-th column are located in a same row, where X is a positive integer greater than or equal to 1 and less than or equal to N1-2, and Y is a positive integer greater than or equal to 1 and less than or equal to M1-2;

wherein, N1 and M1 are positive integers greater than 1, and the pixel islands are respectively formed by the R pixel island, the B pixel island, the first G pixel island, and the second G pixel island.

6. The display device of claim 5, wherein:

the R sub-pixel units in N1 rows and M1 columns are imaged by corresponding lenses to the preset virtual image plane to form R virtual image units in N1 rows and M1 columns;

the B sub-pixel units in N1 rows and M1 columns are imaged by corresponding lenses to the preset virtual image plane to form B virtual image units in N1 rows and M1 columns;

the first G sub-pixel units in N1 rows and M1 columns are imaged by corresponding lenses to the preset virtual image plane to form first G virtual image units in N1 rows and M1 columns;

the second G sub-pixel units in N1 rows and M1 columns are imaged by corresponding lenses to the preset virtual image plane to form second G virtual image units in N1 rows and M1 columns;

among the virtual image units formed by the R pixel island and the B pixel island, in each of row and column direction, a R virtual image unit is arranged as only adjacent to B virtual image units, and a B virtual image unit is arranged as only adjacent to R virtual image units;

among the virtual image units formed by the first G pixel island and the second G pixel island, in each of row and column direction, a first G virtual image unit is arranged as only adjacent to second G virtual image units, and a second G virtual image unit is arranged as only adjacent to first G virtual image units;

the first G virtual image units and the R virtual image units are arranged in a one-to-one correspondence, and any first G virtual image unit at least partially overlaps with a corresponding R virtual image unit;

the second G virtual image units and the B virtual image units are arranged in a one-to-one correspondence, and any second G virtual image unit at least partially overlaps with a corresponding B virtual image unit.

7. The display device of claim 6, further comprising:

a processing unit configured to generate pixel values corresponding to the sub-pixel units in the gaze area based on first image data corresponding to the gaze area, and generate pixel values corresponding to the sub-pixel units in the non-gaze area based on second image data corresponding to the non-gaze area, wherein the first image data and the second image data are comprised in RGB image data acquired by the display device.

8. The display device of claim 7, wherein generating the pixel values corresponding to the sub-pixel units in the gaze area based on the first image data comprises:

acquiring from the RGB image data, according to a position of a target sub-pixel unit in the gaze area, a key sub-pixel corresponding to the target sub-pixel unit and at least one relevant sub-pixel, wherein the relevant sub-pixel is located around the key sub-pixel, and the relevant sub-pixel, the key sub-pixel, and the target sub-pixel unit correspond to a same color; and acquiring a pixel value of the target sub-pixel unit according to a pixel value of the key sub-pixel and a pixel value of the relevant sub-pixel.

9. The display device of claim 8, wherein N1 rows of first virtual image units are formed by the first G virtual image units and the second G virtual image units, with each row of the first virtual image units comprising M1 of the first virtual image units;

the RGB image data corresponds to N1 rows and M1 columns of RGB pixels;

the acquiring from the RGB image data, according to the position of the target sub-pixel unit in the gaze area, the key sub-pixel corresponding to the target sub-pixel unit comprises:

acquiring, from the RGB image data, the key sub-pixel corresponding to the target sub-pixel unit according to a preset rule;

wherein, the preset rules comprises: when the target sub-pixel unit corresponds to a Y-th first virtual image unit at X-th row, the key sub-pixel is located in the X-th row and Y-th column of the RGB image data, where X is a positive integer greater than or equal to 1 and less than or equal to N1, and Y is a positive integer greater than or equal to 1 and less than or equal to M1.

10. The display device of claim 9, wherein N1 rows of second virtual image units are formed by the R virtual image units and the B virtual image units, with each row of the second virtual image units comprising M1 of the second virtual image units; and the preset rule further comprises: when the target sub-pixel unit corresponds to a Y-th second virtual image unit at X-th row, the key sub-pixel is located in the X-th row and Y-th column of the RGB image data, where X is a positive integer greater than or equal to 1 and less than or equal to N1, and Y is a positive integer greater than or equal to 1 and less than or equal to M1.

11. The display device of claim 8, wherein acquiring the pixel value of the target sub-pixel unit according to the pixel value of the key sub-pixel and the pixel value of the relevant sub-pixel comprises:

acquiring, according to the pixel value of the key sub-pixel and the pixel value of the relevant sub-pixel, a weight of the key sub-pixel to the pixel value of the target sub-pixel unit, and a weight of the relevant sub-pixel to the pixel value of the target sub-pixel unit; and acquiring the pixel value of the target sub-pixel unit according to the pixel value of the key sub-pixel, the pixel value of the relevant sub-pixel, the weight of the key sub-pixel, and the weight of the relevant sub-pixel;

wherein, the pixel value of the target sub-pixel unit is calculated based on $h=\Sigma_{k=1}^{n}(h_k a_k)+h_x a_x$, where $h_x$ represents the pixel value of the key sub-pixel, $a_x$ represents the weight of the key sub-pixel, $h_k$ represents the pixel value of the relevant sub-pixel, $a_k$ represents the weight of the relevant sub-pixel, and n is greater than or equal to 1.

12. The display device of claim 8, wherein there are a plurality of the relevant sub-pixels, and the key sub-pixel and the plurality of the relevant sub-pixels are distributed in an array.

13. The display device of claim 12, wherein the key sub-pixel is located at a center of the array.

14. The display device of claim 12, wherein the key sub-pixel and the plurality of the relevant sub-pixels are distributed in a 3*3 array.

15. The display device of claim 7, wherein a virtual image frame is formed by the R virtual image unit, the B virtual image unit, the first G virtual image unit, and the second G virtual image unit corresponding to a same pixel island group;

the virtual image frame comprises a central area and a border area, a density of virtual image units in the border area is less than a density of virtual image units in the central area, and the virtual image units in the border area correspond to first sub-pixel units in the pixel island group; and the processing unit is further configured to set a pixel value corresponding to the first sub-pixel units to 0 gray scale.

16. The display device of claim 7, wherein generating the pixel values corresponding to the sub-pixel units in the non-gaze area based on the second image data comprises:

acquiring, from the RGB image data, a key sub-pixel corresponding to the target sub-pixel unit according to a position of the target sub-pixel unit in the non-gaze area; and acquiring a pixel value of the key sub-pixel as the pixel value of the target sub-pixel unit;

wherein in the gaze area and the non-gaze are, the key sub-pixel corresponding to the target sub-pixel unit is acquired through a same way.

17. A method for driving a display device, comprising:

providing the display device, wherein the display device comprises:

a plurality of pixel island groups arranged in array, wherein each of the pixel island groups comprises a plurality of pixel islands, each of the pixel islands comprises a plurality of sub-pixel units of a same color arranged in array, and different pixel islands are able to be scanned in different scanning modes; and a plurality of lenses arranged in a one-to-one correspondence with the pixel islands, configured to image corresponding pixel islands to a preset virtual image plane;

determining a gaze area and a non-gaze area according to gazed coordinates of human eye, wherein N pixel island groups are provided in the gaze area, and N is a positive integer greater than or equal to 1;

providing, at a scanning stage of the sub-pixel units in the gaze area, gate driving signals to the sub-pixel units in the gaze area row by row; and providing, at a scanning stage of the sub-pixel units in the non-gaze area, gate driving signals simultaneously to multiple adjacent rows of sub-pixel units in the non-gaze area, wherein during scanning of one frame, gate driving signals are provided to the sub-pixel units in any order; and providing, during scanning of one frame, gate driving signals to the sub-pixel units in the gaze area, wherein a gate driving signal is independently provided to a corresponding pixel island, and wherein the display device further comprises: a plurality of switch components arranged in a one-to-one correspondence with the pixel islands, wherein the switch component comprises a plurality of switch units, a number of the switch units is same as a number of columns of sub-pixel units in the pixel island, the sub-pixel units in a same column in the pixel island are connected to a data line through one of the switch units, and the switch unit is configured to connect the data line with the sub-pixel units in the same column in the pixel island in response to a control signal.

* * * * *